United States Patent
Ripoll et al.

(10) Patent No.: US 11,009,631 B2
(45) Date of Patent: May 18, 2021

(54) MICROLENS ARRAY DIFFUSERS

(71) Applicant: ams Sensors Singapore Pte. Ltd., Singapore (SG)

(72) Inventors: Olivier Ripoll, Rüschlikon (CH); Peter Blattner, Hauterive (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 54 days.

(21) Appl. No.: 16/304,365

(22) PCT Filed: May 22, 2017

(86) PCT No.: PCT/SG2017/050265
§ 371 (c)(1),
(2) Date: Nov. 26, 2018

(87) PCT Pub. No.: WO2017/204748
PCT Pub. Date: Nov. 30, 2017

(65) Prior Publication Data
US 2019/0293843 A1 Sep. 26, 2019

Related U.S. Application Data

(60) Provisional application No. 62/341,268, filed on May 25, 2016.

(51) Int. Cl.
*G02B 5/02* (2006.01)
*G02B 3/00* (2006.01)
*G02B 27/48* (2006.01)

(52) U.S. Cl.
CPC ......... *G02B 5/0278* (2013.01); *G02B 3/0043* (2013.01); *G02B 5/0221* (2013.01); *G02B 27/48* (2013.01)

(58) Field of Classification Search
CPC ...... G02B 3/00; G02B 3/0006; G02B 3/0037; G02B 3/0043; G02B 3/005; G02B 3/0056;
(Continued)

(56) References Cited

U.S. PATENT DOCUMENTS

| | | | |
|---|---|---|---|
| 6,410,213 B1 | 6/2002 | Raguin et al. | |
| 6,700,702 B2 | 3/2004 | Sales | |
| 6,972,401 B2 * | 12/2005 | Akitt | G06F 3/03547 250/216 |
| 7,652,822 B2 | 1/2010 | Gardner et al. | |
| 10,451,778 B2 * | 10/2019 | Uchida | G02B 3/00 |

(Continued)

OTHER PUBLICATIONS

ISA/SG, International Search Report for PCT/SG2017/050265 (dated Jul. 26, 2017).

(Continued)

*Primary Examiner* — Arnel C Lavarias
(74) *Attorney, Agent, or Firm* — Michael Best and Friedrich LLP

(57) ABSTRACT

A microlens array diffuser operable to generate a substantially diffuse illumination includes an array of microlenses, wherein each microlens has a respective periodicity-influencing characteristic and a respective surface profile. The array of microlenses includes at least two microlenses having respective periodicity-influencing characteristics that differ from one another and having respective surface profiles that differ from one another. Each surface profile is configured to generate a substantially equal field of illumination. The microlens array diffuser can be integrated as part of an illuminator operable to generate substantially diffuse illumination.

13 Claims, 2 Drawing Sheets

(58) Field of Classification Search
CPC ........ G02B 5/02; G02B 5/0205; G02B 5/021;
G02B 5/0215; G02B 5/0221; G02B
5/0257; G02B 5/0263; G02B 5/0273;
G02B 5/0278; G02B 27/12; G02B 27/123
USPC ....... 359/599, 601, 609, 618, 619, 620, 626,
359/628, 707
See application file for complete search history.

(56) References Cited

U.S. PATENT DOCUMENTS

| | | |
|---|---|---|
| 2002/0145797 A1 | 10/2002 | Sales |
| 2004/0114229 A1 | 6/2004 | Sakaguchi |
| 2004/0130790 A1 | 7/2004 | Sales |
| 2008/0020291 A1 | 1/2008 | Lu |
| 2014/0204608 A1 | 7/2014 | Park et al. |

OTHER PUBLICATIONS

Sales, T.R.M., et al., "Light Tamer," *Photonics Spectra*, vol. 38, No. 6 (Jun. 30, 2004).
Sales, Tasso R.M. et al., "Light Tamers—Engineered microlens arrays provide new control for display and lighting applications.," *Photonics Spectra*, Jun. 1, 2004.
Second Office Action issued from the China Patent Office for related Application No. 201780043969.9 dated Nov. 2, 2020 (8 pages including English Translation).
Office Action issued from the Taiwan Patent Office for related Application No. 106117116 dated Jul. 2, 2020 (13 Pages including the English Translation).

\* cited by examiner

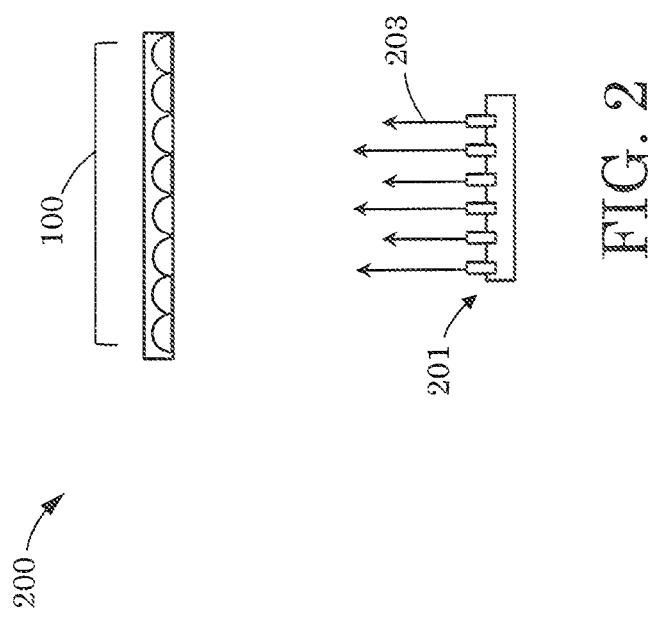

MICROLENS ARRAY DIFFUSERS

FIELD OF THE DISCLOSURE

The present disclosure relates to microlens array diffusers.

BACKGROUND

Optoelectronic modules such as optical ranging systems and proximity sensors typically are configured to operate using diffuse illumination. Such optoelectronic modules may include an illuminator module operable to produce a diffuse illumination in a scene over a particular field of illumination (FOI), and a light sensitive component operable to collect light over a particular field of view (FOV). In typical operation, a substantial portion of the light collected, by the light sensitive component originates from the diffuse illumination that has been reflected from objects in the scene. In some instances a portion of the light collected may be attributed to background light. An illuminator may include a diffuser (e.g., an optical element or series of optical elements) and a light generating component (e.g., LED, VCSEL, or array of LEDs or VCSELs), collectively operable to produce the diffuse illumination.

The illuminator may be tailored (e.g., via the diffuser) to generate a diffuse illumination having particular characteristics that permit optimal performance of the optoelectronic module. These characteristics may include: 1) light distribution within the diffuse illumination over a particular FOI or angular distribution (e.g., spatial power distribution, radiant intensity); 2) termination of the diffuse illumination in space (i.e., the edge characteristics); and 3) high-frequency components within the diffuse illumination (i.e., the presence or absence thereof).

Some illuminators are operable to produce a diffuse illumination having a substantially uniform light distribution (e.g., a uniform spatial power distribution, radiant intensity). Other illuminators are operable to produce a diffuse illumination having a gradually changing light distribution (e.g., a linearly changing spatial power distribution, radiant intensity). A diffuse illumination having higher power near its edges may provide an advantage in some applications. Illuminators operable to generate a uniform light distribution or gradually changing light distribution over a particular FOI may facilitate proximity and/or distance ranging applications, for example.

Some illuminators are operable to produce a diffuse illumination having particularly high-contrast edges in order to utilize light efficiently. For example, since the light sensitive component of optical ranging systems and proximity sensors collect light over a particular FOV, the diffuse illumination need only extend over this FOV. In some instances, when the FOV is greater than the FOI, background light can be collected by the light sensitive component thereby obfuscating proximity and/or distance sensing functions. While in other instances, when the FOV is less than the FOI, light falling outside of the FOV is wasted. Accordingly, a particularly efficient configuration makes use of matched FOI and FOV wherein the diffuse illumination terminates abruptly with high-contrast edges thereby permitting efficient use of resources such as the electrical power used to drive the light generating component.

In addition to the characteristics above, some illuminators produce a diffuse illumination having high-frequency components. High-frequency components may originate from diffractive artifacts and/or interference artifacts. Generally, high-frequency components, or hot spots, result in wasted resources such as electrical power. In some cases they may adversely affect the precision and/or accuracy of the particular application for which the diffuse illumination is intended (e.g., proximity, distance ranging).

Some illuminators can include a diffuser composed of a simple diffusive surface (e.g., sand-blasted surface). Such an illuminator can produce a diffuse illumination having a gradually changing light distribution (e.g., spatial power distribution, radiant intensity); however, the illumination typically would not terminate with high-contrast edges (e.g., the illumination could have substantially Gaussian characteristics). Further, such a diffuser would exhibit particularly high back scattering (i.e., some light incident on the diffuser would not contribute to the diffuse illumination) resulting in reduced operational efficiency.

Some illuminators include a diffuser composed of a microlens array. A microlens array diffuser can overcome some of the limitations of the diffuser described above. For example, the profile of each microlens within the microlens array diffuser can be configured to produce a precisely controlled light distribution, and can be configured to produce an illumination with high-contrast edges. However, such a microlens array diffuser may exhibit significant diffractive artifacts and interference artifacts thereby leading to non-optimal performance. Generally, diffractive artifacts are generated from each microlens within the microlens array diffuser (e.g., at the edges of each microlens) as a result of the relatively small clear aperture size of the microlenses. Further, interference artifacts, generally, are generated from the periodic arrangement of the microlenses within such a microlens array diffuser.

Accordingly, it would be desirable to achieve an illuminator operable to generate a diffuse illumination having: 1) a uniform light distribution or gradually changing light distribution over a particular FOI, 2) high-contrast edges, and/or 3) minimal high-frequency components.

SUMMARY

This disclosure describes microlens array diffusers operable to generate diffuse illuminations having uniform light distribution or gradually changing light distribution over a particular FOI. This disclosure also describes microlens array diffusers operable to generate diffuse illuminations that terminate with high-contrast edges. Moreover, this disclosure describes microlens array diffusers operable to generate diffuse illuminations that have minimal errant high-frequency components. Still further, this disclosure describes illuminators into which such microlens array diffusers are incorporated.

In one aspect, for example, a microlens array diffuser includes an array of microlenses wherein each microlens within the microlens array has a periodicity-influencing characteristic and a surface profile. The array of microlenses includes at least two microlenses having different respective periodicity-influencing characteristics such as, for example, different microlens height, microlens clear aperture size, microlens clear aperture shape, and/or microlens position. Moreover, the at least two microlenses having different respective periodicity-influencing characteristics further have different respective surface profiles. The different respective surface profiles, however, are each operable to generate substantially the same fields of illumination.

In some implementations, the microlens array diffuser is operable to produce a substantially diffuse illumination that terminates with substantially high-contrast edges.

Other aspects, features and advantages will be readily apparent from the following detailed description, the accompanying drawings, and the claims.

BRIEF DESCRIPTION OF THE DRAWINGS

FIG. 2 illustrates an example of an illuminator including a microlens array diffuser.

DETAILED DESCRIPTION

Figure 1B:
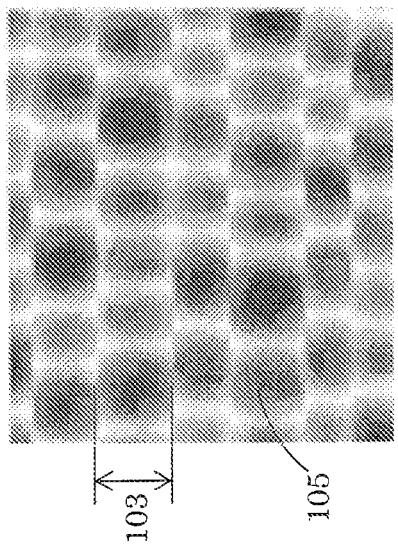
FIGS. 1A, 1B and 1C illustrate an example of a microlens array diffuser.
Figure 1C:
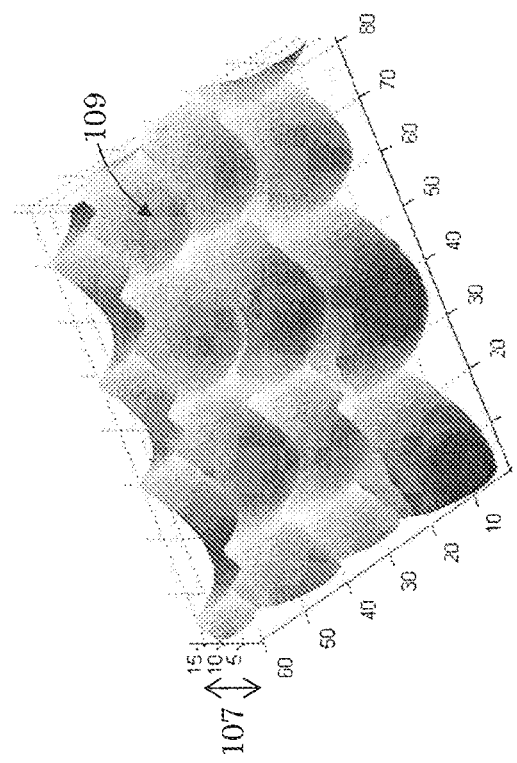
Figure 1A:
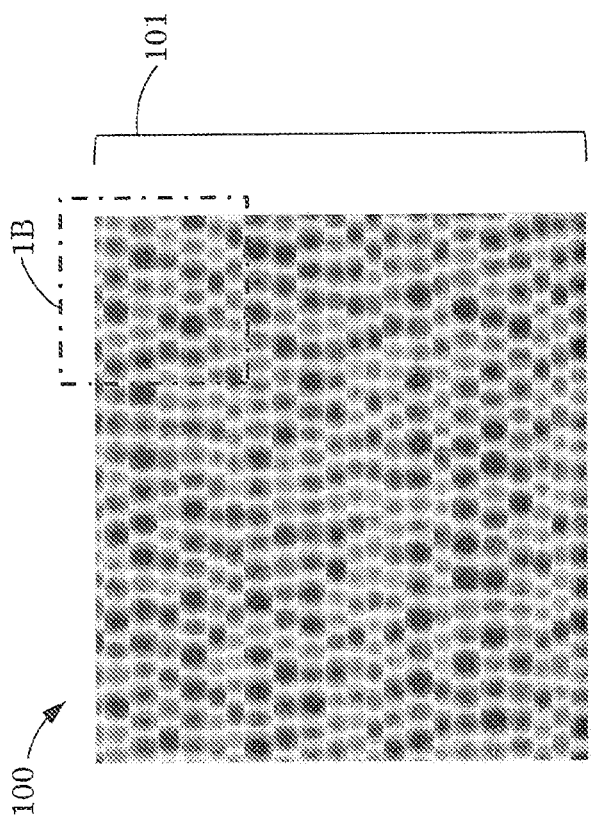

An example of a microlens array diffuser operable to produce a substantially diffuse illumination is depicted in FIGS. 1A, 1B and 1C. FIG. 1A depicts an overview of an exemplary microlens array diffuser including 100's to 1000's of microlenses. FIG. 1B depicts a magnification of a portion of the microlens array diffuser depicted in FIG. 1A. FIG. 1C depicts a three-dimensional profile of a portion of the microlens array diffuser depicted in FIG. 1A.

The microlens array diffuser 100 depicted in FIG. 1A-FIG. 1C can have a microlens-array-diffuser clear aperture size, for example, of less than 1 mm² to a few mm² to hundreds of mm² (e.g., 1 mm×1 mm, 2 mm×2 mm, or even 10 mm×10 mm). Other microlens-array-diffuser clear aperture sizes may be appropriate for some implementations. The microlens array diffuser 100 includes an array of microlenses 101. Each microlens 101 within the microlens array diffuser 100 has a periodicity influencing characteristic. Examples of periodicity influencing characteristics include clear aperture size 103, aperture shape 105, microlens height 107, and microlens position within the microlens array (e.g., periodic, pseudo-random, or random (e.g., non-periodic) positioning of the microlenses). The microlenses 101 may have other periodicity influence characteristics in some instances. Each microlens 101 within the microlens array diffuser 100 is further characterized by a respective surface profile 109. In this example, the microlenses 101 are free-form lenses wherein the surface profile 109 of each microlens can be different from one the surface profile of other microlenses provided the clear aperture size, shape, and/or height of the microlenses also differ.

In the example implementation depicted in FIG. 1A-FIG. 1C, the height 107 of each microlens 101 within the microlens array diffuser 100 can be described by a bivariate x, y polynomial centered on each lens; that is, the x, y coordinates of each microlens are centered on each microlens within the microlens array diffuser 100:

$$H(x, y) = \sum_{p,q} C_{p,q}(x - x_{p,q})^p (y - y_{p,q})^q$$

where H is the height of each microlens 101 within the microlens array diffuser 100 (in this example H=0 is the height of the deepest lens); $C_{p,q}$ are the bivariate coefficients; and $x_{p,q}$ and $y_{p,q}$ are the coordinates of each lens p, q. In this example, only even degrees of the polynomial along x, y are used due to symmetry. Table 1 illustrates example bivariate coefficients and the coordinates of each lens (p, q) of the polynomial along x, y for twenty lenses within the microlens array diffuser 100. This disclosure is not limited to the heights disclosed in Table 1, and in some cases, the height 107 can range from a minimum of 10 μm to 100 μm or more.

TABLE 1

| p | q | Lens 1 ($C_{p,q}$) | Lens 2 ($C_{p,q}$) | Lens 3 ($C_{p,q}$) | Lens 4 ($C_{p,q}$) | Lens 5 ($C_{p,q}$) | Lens 6 ($C_{p,q}$) | Lens 7 ($C_{p,q}$) |
|---|---|---|---|---|---|---|---|---|
| 0 | 0 | 0.009679168 | 0.006456176 | 0.003229489 | 0 | 0.03237843 | 0.029145608 | 0.0259102 |
| 2 | 0 | 23.98007084 | 23.99222412 | 24.00442938 | 24.01563289 | 40.03175693 | 40.05592049 | 40.07318344 |
| 4 | 0 | −469.5846082 | −471.2586111 | −473.4669858 | −475.737654 | −2205.849379 | −2220.690492 | −2231.832711 |
| 6 | 0 | 0 | 0 | 0 | 0 | 0 | 0 | 0 |
| 8 | 0 | 0 | 0 | 0 | 0 | 0 | 0 | 0 |
| 0 | 2 | 26.47636685 | 22.07726164 | 18.92927201 | 16.56447491 | 26.50286085 | 22.0802096 | 18.91779852 |
| 2 | 2 | 144.5472901 | 51.37646466 | 3.617556697 | −19.29648503 | −109.0183198 | −143.2825988 | −127.4664014 |
| 4 | 2 | −157459.4749 | −97169.97653 | −61720.566 | −40489.02947 | −456027.158 | −251433.9295 | −157273.9536 |
| 6 | 2 | 0 | 0 | 0 | 0 | 0 | 0 | 0 |
| 0 | 4 | −586.3194705 | −345.750979 | −219.404374 | −146.9463242 | −601.078141 | −343.4781854 | −212.6142581 |
| 2 | 4 | −153844.0551 | −57456.42704 | −24570.34516 | −12850.71054 | −140469.1815 | −87446.65881 | −72149.82115 |
| 4 | 4 | 36774726.24 | 5893571.531 | −2509407.261 | −4063055.776 | −143864208.7 | −99267313.65 | −54551123.67 |
| 0 | 6 | 0 | 0 | 0 | 0 | 0 | 0 | 0 |

| p | q | Lens 8 ($C_{p,q}$) | Lens 9 ($C_{p,q}$) | Lens 10 ($C_{p,q}$) | Lens 11 ($C_{p,q}$) | Lens 12 ($C_{p,q}$) | Lens 13 ($C_{p,q}$) | Lens 14 ($C_{p,q}$) |
|---|---|---|---|---|---|---|---|---|
| 0 | 0 | 0.022672806 | 0.026706302 | 0.023476053 | 0.020242961 | 0.017007666 | 0.021032201 | 0.017804428 |
| 2 | 0 | 40.08477319 | 34.29443843 | 34.3162759 | 34.33364613 | 34.34665549 | 29.99415623 | 30.0127442 |
| 4 | 0 | −2239.616571 | −1381.326488 | −1390.574316 | −1398.452321 | −1404.605513 | −921.4539271 | −926.9789946 |
| 6 | 0 | 0 | 0 | 0 | 0 | 0 | 0 | 0 |
| 8 | 0 | 0 | 0 | 0 | 0 | 0 | 0 | 0 |
| 0 | 2 | 16.54513507 | 26.50161867 | 22.08532779 | 18.92589394 | 16.55417386 | 26.4954617 | 22.08559083 |
| 2 | 2 | −98.70589158 | −2.441964235 | −75.34782052 | −90.23044124 | −82.51159572 | 70.69554626 | −19.68931293 |
| 4 | 2 | −111890.8992 | −345052.3427 | −192419.9876 | −116329.5196 | −77182.48158 | −263987.0573 | −151904.2927 |
| 6 | 2 | 0 | 0 | 0 | 0 | 0 | 0 | 0 |
| 0 | 4 | −140.006146 | −602.2727337 | −347.4049449 | −216.3011313 | −142.7962493 | −599.1482132 | −348.6414941 |
| 2 | 4 | −62418.12244 | −131418.7196 | −58812.06691 | −40458.45296 | −34114.67023 | −139692.3948 | −52665.02218 |
| 4 | 4 | −26209517.53 | −36128841.72 | −47630222.19 | −33742615.4 | −20367957.98 | 12464833.3 | −17714477.25 |
| 0 | 6 | 0 | 0 | 0 | 0 | 0 | 0 | 0 |

| p | q | Lens 15 ($C_{p,q}$) | Lens 16 ($C_{p,q}$) | Lens 17 ($C_{p,q}$) | Lens 18 ($C_{p,q}$) | Lens 19 ($C_{p,q}$) | Lens 20 ($C_{p,q}$) |
|---|---|---|---|---|---|---|---|
| 0 | 0 | 0.014573541 | 0.011340255 | 0.015356417 | 0.012131057 | 0.008902298 | 0.005670941 |
| 2 | 0 | 30.0288612 | 30.04194037 | 26.65191495 | 26.66715062 | 26.68139994 | 26.69374787 |
| 4 | 0 | −932.2960118 | −936.8538011 | −645.2789177 | −648.4318417 | −651.9098692 | −655.1667006 |
| 6 | 0 | 0 | 0 | 0 | 0 | 0 | 0 |

TABLE 1-continued

| | | | | | | | |
|---|---|---|---|---|---|---|---|
| 8 | 0 | 0 | 0 | 0 | 0 | 0 | 0 |
| 0 | 2 | 18.9299414 | 16.5601572 | 26.4865579 | 22.08250046 | 18.9307875 | 16.56342506 |
| 2 | 2 | −53.16583995 | −60.44734638 | 117.2313645 | 21.95506184 | −21.49562655 | −38.55912038 |
| 4 | 2 | −92240.95075 | −59666.45006 | −203242.1288 | −121183.9131 | −75077.10098 | 48607.98863 |
| 6 | 2 | 0 | 0 | 0 | 0 | 0 | 0 |
| 0 | 4 | −218.533973 | −144.9048595 | −593.4201603 | −347.8771488 | −219.4780082 | −146.2643277 |
| 2 | 4 | −28223.29313 | −20751.50204 | −148675.1814 | −54199.63416 | −24623.60685 | −14941.46355 |
| 4 | 4 | −18189035.72 | −13250586.85 | 31568237 | −1871089.913 | −8327579.044 | −7772747.362 |
| 0 | 6 | 0 | 0 | 0 | 0 | 0 | 0 |

In the illustrated example, the clear aperture shape of each microlens 101 is rectangular; however, shapes can be used in some implementations. The clear aperture shape 105 can be, for example, rectangular shaped, as depicted in FIG. 1A-FIG. 1C, square shaped, circularly symmetric, or a combination of these or other geometric shapes. Examples of clear aperture dimensions (i.e., defining respective clear aperture sizes) are illustrated in Table 2; other clear aperture dimensions may be applicable for some implementations. For example, in some instances, the clear aperture dimensions can vary such that the clear aperture size 103 can range from 30 μm up to 80 μm or even 100 μm.

TABLE 2

| Lens | $W_x$ [mm] | $W_y$ [mm] |
|---|---|---|
| 1 | 0.1 | 0.05 |
| 2 | 0.1 | 0.06 |
| 3 | 0.1 | 0.07 |
| 4 | 0.1 | 0.08 |
| 5 | 0.06 | 0.05 |
| 6 | 0.06 | 0.06 |
| 7 | 0.06 | 0.07 |
| 8 | 0.06 | 0.08 |
| 9 | 0.07 | 0.05 |
| 10 | 0.07 | 0.06 |
| 11 | 0.07 | 0.07 |
| 12 | 0.07 | 0.08 |
| 13 | 0.08 | 0.05 |
| 14 | 0.08 | 0.06 |
| 15 | 0.08 | 0.07 |
| 16 | 0.08 | 0.08 |
| 17 | 0.09 | 0.05 |
| 18 | 0.09 | 0.06 |
| 19 | 0.09 | 0.07 |
| 20 | 0.09 | 0.08 |

Furthermore, a set of x coordinates for the twenty lenses in this example is illustrated in Table 3A and Table 3B, and a set of corresponding y coordinates for the same twenty lenses is illustrated in Table 3C and Table 3D. Both x, y coordinates are given in millimeters (mm). The x, y coordinates given in Tables 3A-3D are examples of microlens position; other microlens positions may be applicable for other implementations. For example, in some implementations the coordinates may be assigned to each microlens 101 such that the microlenses are arranged periodically, pseudo randomly, or randomly.

TABLE 3A

| Lens 1 | Lens 2 | Lens 3 | Lens 4 | Lens 5 | Lens 6 | Lens 7 | Lens 8 | Lens 9 | Lens 10 |
|---|---|---|---|---|---|---|---|---|---|
| −1.09 | −1.15 | −1.09 | −1.15 | −0.87 | −1.17 | −1 | −1.09 | −1.085 | −1.065 |
| −0.97 | −1 | −1 | −1.01 | −0.83 | −1 | −0.87 | −1.09 | −1.075 | −1.015 |
| −0.99 | −0.9 | −0.83 | −0.89 | −0.77 | −0.85 | −0.75 | −1 | −1.075 | −0.965 |
| −0.99 | −0.93 | −0.68 | −0.94 | −0.75 | −0.8 | −0.78 | −1.03 | −1.015 | −0.815 |
| −0.95 | −0.88 | −0.61 | −0.95 | −0.71 | −0.79 | −0.75 | −0.75 | −0.885 | −0.735 |
| −0.9 | −0.84 | −0.59 | −0.83 | −0.66 | −0.6 | −0.69 | −0.79 | −0.905 | −0.665 |
| −0.67 | −0.74 | −0.52 | −0.83 | −0.74 | −0.6 | −0.69 | −0.65 | −0.915 | −0.665 |

TABLE 3B

| Lens 11 | Lens 12 | Lens 13 | Lens 14 | Lens 15 | Lens 16 | Lens 17 | Lens 18 | Lens 19 | Lens 20 |
|---|---|---|---|---|---|---|---|---|---|
| −1.005 | 1.165 | −1.08 | −0.92 | −1.07 | −1.16 | −1.155 | −1.095 | −1.025 | −1.155 |
| −0.935 | −1.095 | −1.04 | −0.93 | −0.93 | −1.07 | −1.155 | −0.635 | −0.775 | −1.055 |
| −0.945 | −1.025 | −0.9 | −0.84 | −0.82 | −1.06 | −1.155 | −0.535 | −0.765 | −0.985 |
| −0.915 | −0.985 | −0.84 | −0.88 | −0.85 | −0.92 | −1.065 | −0.495 | −0.775 | −0.965 |
| −0.805 | −0.885 | −0.81 | −0.74 | −0.69 | −0.81 | −0.995 | −0.445 | −0.705 | −0.925 |
| −0.735 | −0.885 | −0.76 | −0.76 | −0.68 | −0.8 | −0.995 | −0.435 | −0.615 | −0.905 |
| −0.595 | −0.815 | −0.73 | −0.8 | −0.61 | −0.82 | −0.935 | −0.405 | −0.615 | −0.715 |

TABLE 3C

| Lens 1 | Lens 2 | Lens 3 | Lens 4 | Lens 5 | Lens 6 | Lens 7 | Lens 8 | Lens 9 | Lens 10 |
|---|---|---|---|---|---|---|---|---|---|
| 0.405 | −0.06 | 0.295 | 0.22 | −0.555 | −0.22 | −0.365 | −0.29 | −0.505 | −0.06 |
| −0.165 | −0.22 | 0.605 | −0.29 | −0.115 | −0.06 | 0.295 | 0.47 | −0.115 | 0.54 |
| −0.115 | −0.22 | 0.735 | −0.62 | −0.505 | −0.69 | −0.835 | 0.14 | 0.075 | 0.67 |

TABLE 3C-continued

| Lens 1 | Lens 2 | Lens 3 | Lens 4 | Lens 5 | Lens 6 | Lens 7 | Lens 8 | Lens 9 | Lens 10 |
|---|---|---|---|---|---|---|---|---|---|
| 0.075 | 0.54 | 0.865 | 0.01 | 0.075 | 0.67 | −0.365 | 0.47 | −0.505 | −0.22 |
| −0.555 | 0.67 | −0.835 | 0.47 | −0.505 | −0.69 | 0.735 | −0.29 | −0.165 | 0.67 |
| 0.405 | −0.06 | 0.605 | −0.29 | −0.165 | −0.97 | −0.835 | 0.01 | 0.075 | −0.97 |
| 0.075 | −0.06 | −0.365 | 0.14 | 0.925 | −0.22 | 0.735 | −0.44 | 0.355 | −0.22 |

TABLE 3D

| Lens 11 | Lens 12 | Lens 13 | Lens 14 | Lens 15 | Lens 16 | Lens 17 | Lens 18 | Lens 19 | Lens 20 |
|---|---|---|---|---|---|---|---|---|---|
| 0.295 | 0.01 | 0.355 | −0.69 | −0.365 | −0.29 | −0.165 | −0.22 | 0.605 | 0.14 |
| 0.295 | 0.01 | −0.555 | −0.06 | −0.365 | 0.14 | −0.115 | 0.8 | −0.905 | −0.44 |
| 0.605 | 0.01 | −0.115 | 0.54 | −0.835 | 0.22 | 0.075 | −0.69 | 0.605 | −0.62 |
| 0.735 | 0.22 | 0.355 | 0.8 | −0.365 | −0.29 | −0.165 | 0.67 | 0.865 | −0.44 |
| 0.295 | −0.76 | 0.405 | −0.22 | −0.905 | −0.76 | 0.355 | −1.09 | −0.365 | 0.14 |
| 0.295 | −0.44 | 0.355 | 0.54 | 0.605 | −0.62 | 0.405 | 0.54 | −0.365 | 0.22 |
| 0.865 | −0.44 | 0.405 | 0.8 | −0.905 | 0.22 | −0.505 | 0.67 | 0.735 | 0.01 |

In accordance with some implementations, the microlens array diffusers are operable to produce substantially diffuse illuminations and have at least two microlenses with different periodicity influencing characteristics and different respective surface profiles, such as the microlens array diffuser 100 depicted in FIG. 1A-FIG. 1C. Different periodicity influencing characteristics can be chosen, in some cases, to minimize interference artifacts in the generated diffuse illumination. In some cases different periodicity influence characteristics can be chosen to increase or maximize overlap of diffractive artifacts in the generated diffuse illumination. Still further, different periodicity influencing characteristics can be chosen to reduce or minimize interference artifacts and also to increase or maximize overlap of diffractive artifacts.

Preferably, the microlens periodicity influencing characteristics and surface profiles are operable to generate a substantially diffuse illumination having a uniform light distribution or gradually changing light distribution. In some implementations, the light distribution is a linearly changing spatial power distribution or radiant intensity. In other implementations, the light distribution is characterized by a constant irradiance on a plane perpendicular to an optical axis of the microlens array diffuser; that is, the radiant intensity can follow $1/\cos^3(\theta)$ where $\theta$ is an angle of the angular distribution. Still in other implementation, the light distribution is characterized by a constant radiant intensity on a plane perpendicular to an optical axis of the microlens array diffuser; that is, the irradiance can follow $\cos^3(\theta)$ where $\theta$ is an angle of the angular distribution. Preferably, the microlens periodicity influencing characteristics and surface profiles are operable to generate a substantially diffuse illumination that terminates with high-contrast edges.

In the illustrated example, each microlens 101 within the microlens array diffuser 100 is operable to produce a 100°×70° rectangular field of illumination; however, in some implementations, the microlens array diffusers are operable to produce other fields of illumination. For example, in some instances the microlens array diffuser is operable to produce a field of illumination of 70°×50°, while in other instances microlens array diffusers is operable to produce a field of illumination up to 120° or even 130°. In some implementations, each microlens 101 within the microlens array diffuser 100 is operable to generate illumination for a field of illumination having an aspect ratio of 4:3, 16:9, or even 100:1. In some instances, the fields of illumination may have other aspect ratios.

A microlens array diffuser, such as the microlens array diffuser described above, can be incorporated, for example, into an illuminator 200 as depicted in FIG. 2. The illuminator 200 includes a light generating component 201 and a diffuser 100. The light generating component 201 can include, for example, a light emitting diode (LED), a superluminescent diode (SLED), or a laser diode such as an edge-emitting laser or vertical-cavity surface-emitting laser (VCSEL). In other implementations, the light generating component 201 can include an array of light emitting diodes and/or laser diodes. For example, the light generating component 201 can include a 2×2 array of discrete light-generating components (e.g., LEDs, SLEDs, or VCSELs), or can include tens, hundreds or thousands of discrete light-generating components (e.g., LEDs, SLEDs, or VCSELs). The light generating component 201 can be operable to produce light 203 of any wavelength or range of wavelengths suitable for a particular application.

In the illustrated example of FIG. 1A-FIG. 1C, a wavelength of 850 nm was used to determine the specific parameters disclosed above; however, other wavelengths or ranges of wavelengths may be appropriate for some implementations. For example, in some instances, the diffuse illumination should be invisible to human observer; accordingly, in such instances, the range of wavelengths can correspond to the near infrared and/or infrared. In some instances, the light generating component 201 is operable to produce light 203 having a wavelength of 850 nm or 940 nm. Still in some instances, other wavelengths may be appropriate. In some implementations, the light generating component can be operable to generate pulsed light or modulated light (e.g., frequency domain modulated light) such as may be used for time-of-flight applications.

In practical implementations, some residual high-frequency components may still be present. Nevertheless, the microlens array diffusers described here still can be operable to produce substantially diffuse illumination having substantially high contrast edges and substantially uniform power that is sufficient for particular applications.

Various modifications can be made within the spirit of this disclosure. Accordingly, other implementations are within the scope of the claims.

What is claimed is:

1. A microlens array diffuser operable to generate a diffuse illumination, the microlens array diffuser comprising:
    an array of microlenses, each microlens having a respective periodicity-influencing characteristic and a respective surface profile;
    the array of microlenses including at least two microlenses having respective periodicity-influencing characteristics that differ from one another; and
    the at least two microlenses whose respective periodicity-influencing characteristics differ from one another further having respective surface profiles that differ from one another;
    wherein each surface profile is configured to generate a same field of illumination.

2. The microlens array diffuser of claim 1 wherein the microlens array diffuser operable is operable to generate diffuse illumination that terminates with high-contrast edges.

3. The microlens array diffuser of claim 1 wherein the periodicity-influencing characteristics include at least one of a microlens height, a microlens clear aperture size, a microlens clear aperture shape, or a microlens position.

4. The microlens array diffuser of claim 1 wherein the respective surface profiles of the at least two microlenses, whose respective periodicity-influencing characteristics differ from one another, are operable to direct diffractive artifacts to adjacent regions within the diffuse illumination such that respective edge portions of the diffractive artifacts overlap to form a diffuse illumination with uniform power.

5. The microlens array diffuser of claim 1 wherein the respective periodicity-influencing characteristics of the at least two microlenses are operable to reduce interference artifacts within the diffuse illumination.

6. The microlens array diffuser of claim 1 wherein the respective periodicity-influencing characteristics of the at least two microlenses are operable to generate a diffuse illumination having a uniform light distribution.

7. The microlens array diffuser of claim 1 wherein the respective periodicity-influencing characteristics of the at least two microlenses are operable to generate a diffuse illumination having a linear light distribution.

8. The microlens array diffuser of claim 1 wherein the respective periodicity-influencing characteristics of the at least two microlenses are operable to generate a diffuse illumination having fewer high-frequency components.

9. The microlens array diffuser of claim 1 wherein the at least two microlenses, whose respective periodicity-influencing characteristics differ from one another and that have respective surface profiles that differ from one another, are in a non-periodic arrangement within the microlens array.

10. The microlens array diffuser of claim 1 in which at least one microlens in the microlens array is rectangular.

11. An illuminator operable to generate a diffuse illumination, the illuminator comprising:
    a microlens array diffuser in accordance with claim 1, and
    a corresponding light generating component,
    wherein the light generating component includes at least one of a light-emitting diode, a laser diode, an array of light-emitting diodes, or an array of laser diodes.

12. The illuminator of claim 11, wherein the light generating component is operable to generate infrared wavelength of light.

13. The illuminator of claim 11, wherein the light generating component is mounted to a substrate, and the microlens array diffuser is mounted to the substrate by a spacer.

* * * * *